T. A. COLEMAN.
SAW WORKS MECHANISM.
APPLICATION FILED JAN. 2, 1918.
1,354,887.
Patented Oct. 5, 1920.
3 SHEETS—SHEET 1.
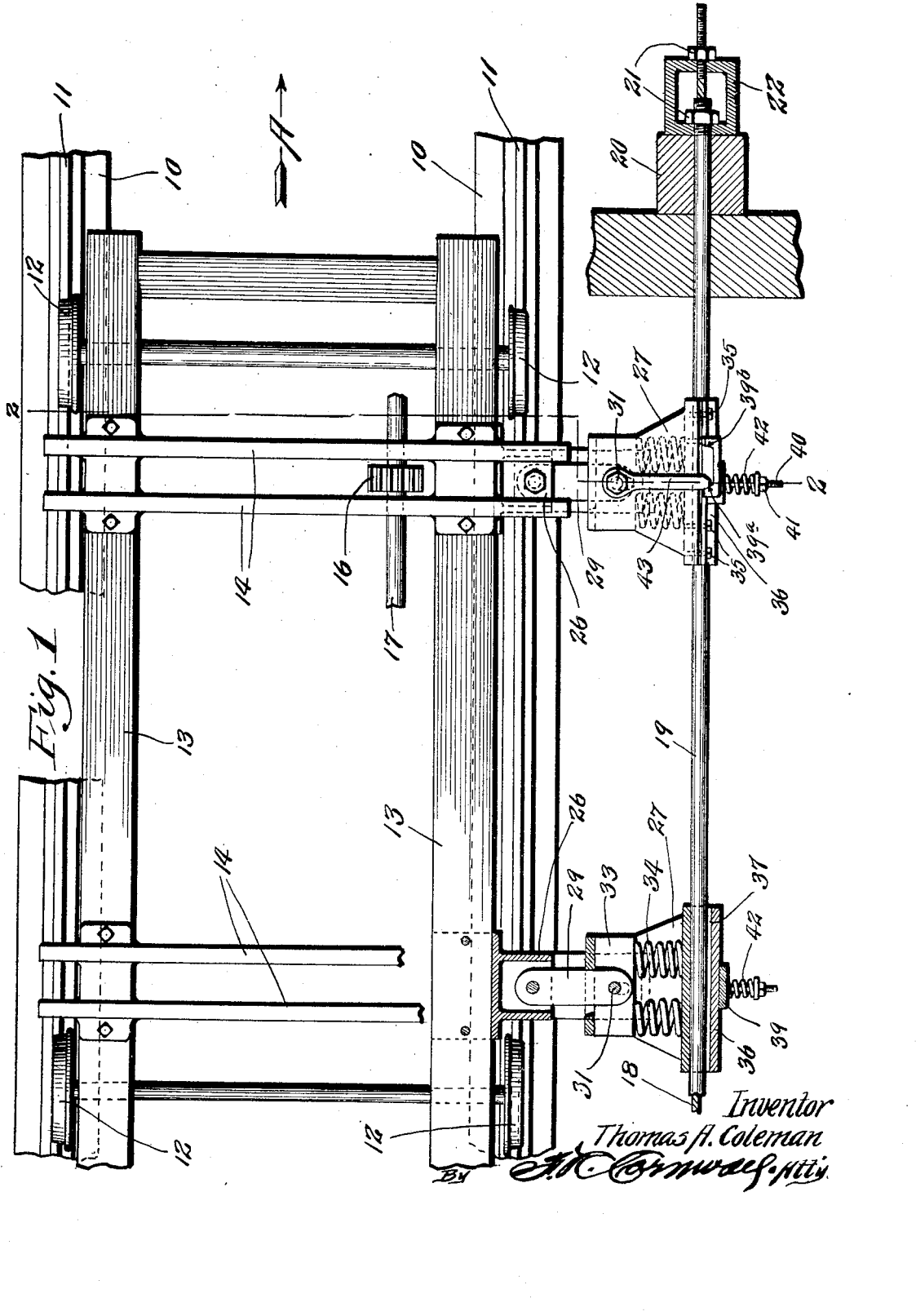
Inventor
Thomas A. Coleman

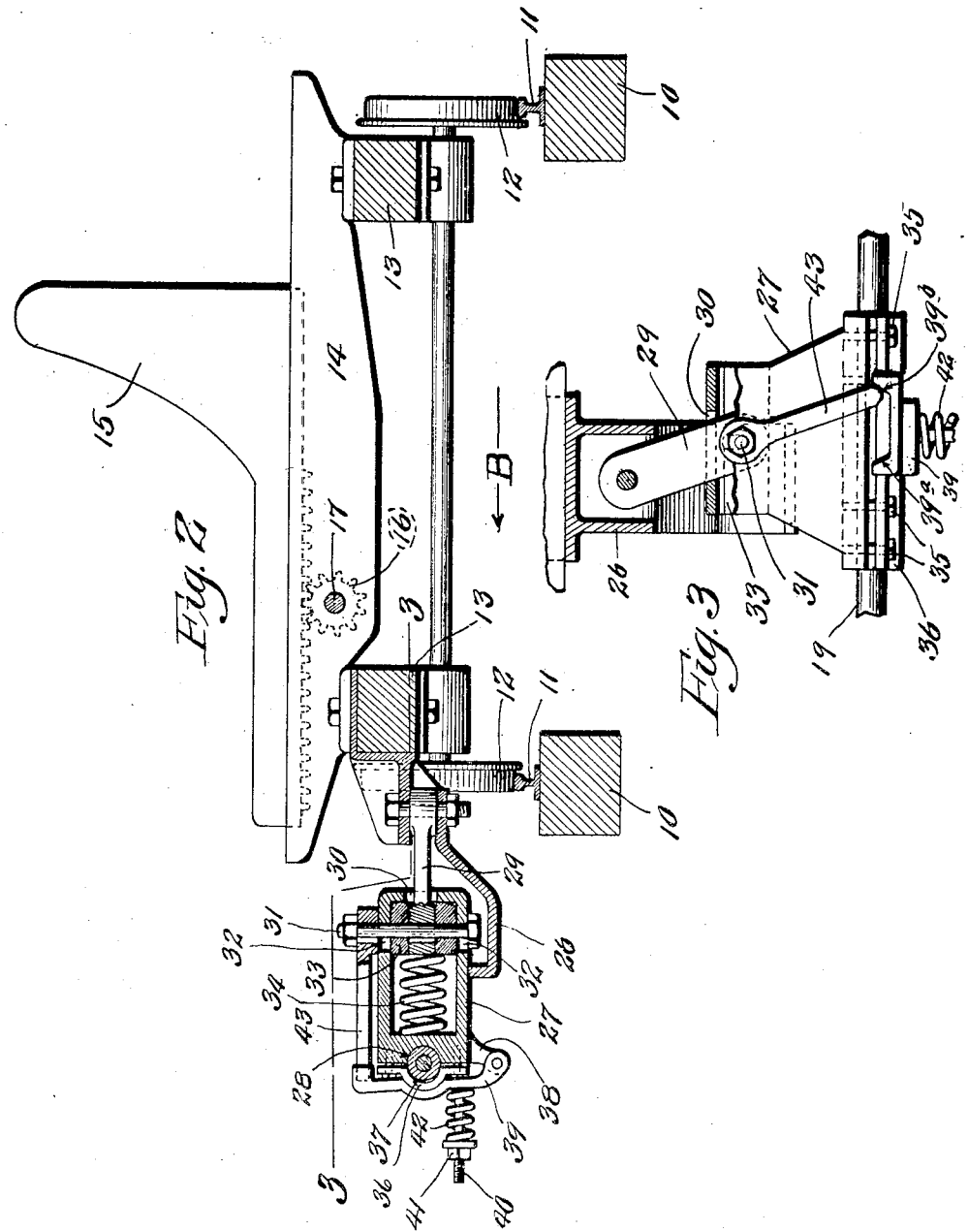

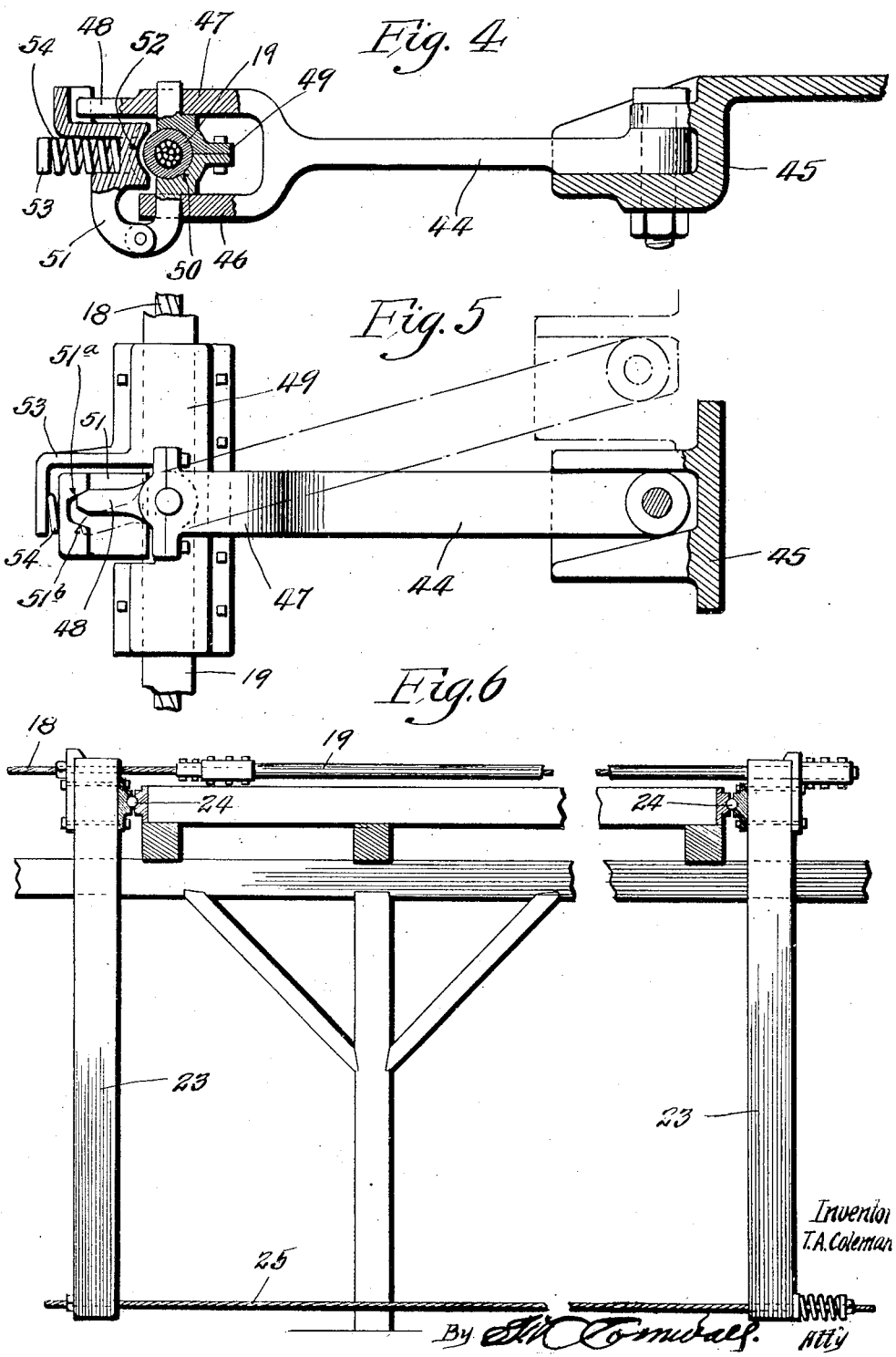

UNITED STATES PATENT OFFICE.

THOMAS A. COLEMAN, OF VREDENBURGH, ALABAMA.

SAW-WORKS MECHANISM.

1,354,887.   Specification of Letters Patent.   Patented Oct. 5, 1920.

Application filed January 2, 1918. Serial No. 209,952.

*To all whom it may concern:*

Be it known that I, THOMAS A. COLEMAN, a citizen of the United States, residing at Vredenburgh, Alabama, have invented a certain new and useful Improvement in Saw-Works Mechanism, of which the following is a full, clear, and exact description, such as will enable others skilled in the art to which it appertains to make and use the same, reference being had to the accompanying drawings, forming part of this specification.

My invention relates generally to saw mills and more particularly to the guiding and offset mechanism utilized in connection with the log carriage, the principal object of my invention being to provide comparatively simple and effective means for guiding the carriage in its backward and forward movement relative to the saw, and further, to provide simple and efficient means for offsetting or retracting the log relative to the saw, so that the log will clear the saw during the return or backward travel of the carriage.

A further object of my invention is to provide a saw mill offset mechanism which is practically automatic in its operation, thereby requiring no attention on the part of the operator of the mill.

In practically all the saw mills now in general use, the supporting rails for the carriage perform the functions of guides as well as supports, but owing to camparatively rapid wear between the rails and the flanges of the carriage wheels, and further, for the reason that the rails cannot easily be maintained in proper alinement and parallel with each other, said rails do not always function properly as guides, and it is one of the objects of my invention to do away with the necessity of depending on the supporting rails for guiding the carriage in its travel past the saw.

My invention contemplates the use of a guiding member which is preferably made up of a cable under tension, and said cable being inclosed by a tube which is also under tension.

The traveling carriage has operative engagement with this guiding member so that during the backward and forward movement of the carriage, the supported log is held absolutely true and at the proper alinement relative to the saw.

My invention further contemplates the provision of comparatively simple means for placing the guiding member or the parts composing the same under a comparatively high degree of tension, this condition being essential to the successful operation of the offset mechanism.

With the foregoing and other objects in view, my invention consists in certain novel features of construction and arrangement of parts, hereinafter more fully described and claimed, and illustrated in the accompanying drawings, in which—

Figure 1 is a plan view of a saw mill carriage, the same being connected to a guiding member of my improved construction.

Fig. 2 is a transverse section taken approximately on the line 2—2 of Fig. 1.

Fig. 3 is an enlarged horizontal section taken approximately on the line 3—3 of Fig. 2.

Fig. 4 is a detail elevational view partly in section of a form of device forming a connection between the carriage and the guide and which device is effective in performing the offsetting operation.

Fig. 5 is a plan view of the offset mechanism illustrated in Fig. 4.

Fig. 6 is an elevational view partly in section of the means employed for placing the guiding member under tension.

Referring by numerals to the accompanying drawings, and particularly to the construction illustrated in Figs. 1 to 3 inclusive, 10—10 designate track timbers, the same supporting track rails 11 and bearing thereupon are the supporting wheels 12 of the carriage 13. Positioned on this carriage are the usual head blocks 14 between which are positioned the usual knees 15. These knees are actuated in any suitable manner to move the supported log toward the saw, preferably by means of pinions such as 16, the same being carried by a longitudinally disposed shaft 17 and engaging racks formed on the undersides of the base portions of said knees.

Located adjacent to one of the track timbers 10 and positioned parallel therewith is the carriage guiding member contemplated by my invention, and the particular form of guide illustrated in Figs. 1, 2 and 3 is composed of a comparatively heavy cable 18 which is inclosed in a tube 19. The ends of this cable and tube are anchored in suitable supports 20 and suitable means is provided for maintaining said cable and tube under tension.

In Fig. 1 I have illustrated the ends of the cable and tube provided with nuts 21, the same bearing against a block 22 through which the members forming the guide pass, and when these nuts are tightened, said members will be placed under tension and maintained in a taut condition.

In Fig. 6 I have illustrated a comparatively simple arrangement for imparting tension to the guiding member and maintaining it in such condition, this construction including a pair of levers 23, the same being fulcrumed on roller bearings 24, and the ends of their long arms being connected by a cable 25.

The ends of the guiding member comprising the cable 18 and tube 19 are anchored in the short arms of these levers and when the ends of the long arms of said levers are drawn together by shortening cable 25, the guiding member comprising parts 18 and 19 will be placed under a high degree of tension.

It will be understood that a guiding member applicable for use in connection with saw mill carriages, must be of considerable length and to perform the desired functions in the proper manner, it is essential that said guide be absolutely straight and rigid, and by my improved construction, which includes a cable under high tension and inclosed in a tube, these conditions can be very easily produced and maintained.

In the operation of saw mill carriages, it will be understood that it is essential that the carriage carrying the log be drawn away from or offset relative to the saw during the reverse or rearward travel of said carriage, so that the log will not come in contact with the saw during such rearward movement, and to effect this offsetting movement, I have provided automatically operating means, the same serving as a connection between the carriage and carriage guiding member. One form of this offsetting mechanism or device is illustrated in Figs. 1 to 3 inclusive. There are two or more of the devices arranged between the carriage and the guide therefor, but as all of these devices are alike in construction, but one will be described.

Secured in any suitable manner to the side rail of the carriage which is immediately adjacent to the guiding member is an outwardly projecting bracket 26, the same serving as a support for a housing 27, the latter being provided in its outer face with a horizontally disposed groove 28, the same serving as a seat for the tubular member 19 of the carriage guide.

Pivotally connected to bracket 26 is the inner end of a link 29, the outer portion of which extends through a slot 30 in one of the walls of housing 27, and rigidly fixed to the outer end of this link 29 is a vertically disposed pin 31, the same extending through slots 32 which are formed in the top and bottom walls of housing 27. Carried by this pin 31 above and below the outer end of link 29 and within the housing are blocks 33, and interposed between the ends of these blocks and the outer wall of housing 27 are compression springs 34.

Loosely mounted on pins 35 which project outwardly from housing 27 is a plate 36 which performs the functions of a shoe to grip the carriage guiding member and this shoe is provided in its inner face with a longitudinally disposed groove 37 which coöperates with the groove 28 to receive said guiding member.

Depending from housing 27 is a bracket 38 and pivotally connected thereto is the lower end of an upwardly projecting plate 39, the same bearing against the central portion of shoe 36. Seated in the lower portion of housing 27 and projecting outwardly through plates 36 and 38 is a pin 40, the same carrying a nut 41, and interposed between this nut and plate 39 is a compression spring 42.

Rigidly fixed in any suitable manner to the upper end of pin 31 is the inner end of a finger 43, the outer end of which is adapted to bear against either one of a pair of shoulders $39^a$ and $39^b$, the same being formed on the inner face of the upper portion of plate 39. The parts of the offsetting device thus constructed and particularly link 29 and finger 43, are proportioned so that when said link and finger occupy a plane substantially at right angles to the carriage guiding member and which position is assumed while the carriage is traveling forward or during the cutting operation, the finger 43 will bear against shoulder $39^a$ and force plate 39 outward away from shoe 36 and against the resistance offered by spring 42. Consequently, shoe 36 does not bear with any substantial degree of friction against the guiding member during the greater portion of the travel of the carriage.

During the sawing operation, the carriage travels in the direction indicated by the arrow A, Fig. 1, and during such movement, the parts of the offsetting devices occupy the positions illustrated in Figs. 1 and 2 with the shoes 36 held a slight distance away from the guiding member but with the housings 27 bearing against the inner portion of said guiding member and coöperating to maintain the carriage in true alinement during its movement toward and past the saw.

At the beginning of the return or reverse movement of the carriage, bracket 26 will be moved in the direction indicated by the arrow B in Fig. 3, with the result that link 29 will shift into an angular or inclined position with respect to the carriage guiding member, and this movement slightly rotates pin 31 and likewise moves finger 43 into an angular or inclined position with its outer end bearing against shoulder 39$^b$. (See Fig. 3). During the movement of the end of finger 43 from shoulder 39$^a$ to shoulder 39$^b$, shoe 36 is free to move forward into engagement with the guiding member under the influence of spring 42, thereby locking said shoe and member 27 to said guiding member, this action of locking holding said shoes on the guiding member until the carriage has moved a sufficient distance to bring the end of finger 43 against shoulder 39$^b$, vice versa whereby plate 39 will be moved outward, thereby releasing shoe 36 from its gripping engagement with said guiding member. By virtue of the angular positions of the parts 29 and 43, the distance between the upper end of plate 39 and the axis of the pivot point between link 29 and bracket 26 is shortened, and as a result, the carriage is shifted away from or offset slightly with respect to the saw, and it will maintain this offset position during the entire return or reverse movement, and consequently, the log will not contact with the saw during such reverse movement.

It will be understood that the power operated means for reciprocating the carriage is directly connected to the latter, and as said carriage is moved rearwardly, the link 29 and finger 43 will maintain their inclined position, consequently holding shoe 36 away from the guiding member. The parts of the offsetting mechanism maintain the relative positions as illustrated in Fig. 3, during the entire return or reverse movement of the carriage, and consequently the latter remains in its offset position throughout its entire rearward movement.

At the beginning of the subsequent forward movement, the link 29 and finger 43 will be shifted into positions at right angles to the guiding member by virtue of said fingers engaging shoulder 39$^b$ on the plate 39, which plate now grips the cable and is held stationary, as illustrated in Figs. 1 and 2, and as the forward movement takes place, the carriage will again be shifted laterally into proper position to move toward and past the saw.

It will be understood that there is slight lateral play between the flanges of the wheels 12 and the track rails 11, such play being necessary to permit the offsetting movement of the carriage, but such lateral play in nowise affects the movement of the carriage during its travel toward and away from the saw, for during such movement, said carriage is guided entirely by the member comprising the parts 18 and 19 and the offsetting mechanism which forms a connection between said guiding member and the carriage.

The springs 34 are utilized as shock absorbers and for preventing the transmission of undue strains onto the guiding member, and which strains are usually developed where comparatively heavy logs are delivered onto the head blocks of the carriage.

In the modified form of offsetting mechanism illustrated in Figs. 4 and 5, a link 44 is pivotally connected to a bracket 45 which latter is secured to the frame of the carriage, and the outer end of said link is bifurcated to form legs 46 and 47, the latter being extended outwardly to form a finger 48.

Pivotally mounted between the legs 46 and 47 is a block 49 in the outer face of which is formed a groove 50 adapted to receive the carriage guiding member, and hinged to the lower portion of this block is a shoe 51, the same being provided on its inner face with a groove 52 which is adapted to bear against the carriage guiding member.

Interposed between the outer face of the shoe 51 and a bracket 52 which projects outwardly from block 49 is a compression spring 54 which tends to force shoe 51 against the carriage guiding member. The outer end of finger 48 bears against shoulder 51$^a$ and 51$^b$ on the upper end of shoe 51 and when link 44 is in a position at right angles to the guiding member or in an angular position as shown by dotted lines in Fig. 5, the end of said finger 48 bears against one or the other of the shoulders 51$^a$ and 51$^b$ to force shoe 51 away from the guiding member. At the ends of the travel of the carriage, the end of the finger moving from one shoulder to another, permits the shoe 51 to move inward under the influence of spring 54 to grip the guiding member during the time the offsetting operation is being effected.

When this form of offsetting mechanism is utilized, the link 44 maintains a position at right angles to the guiding member during the forward or cutting movement of the carriage, thereby coöperating with the guiding member to guide the carriage in proper alinement during its forward movement and upon the return or reverse movement of the carriage, said link is swung into the angular position as illustrated by dotted lines in Fig. 5, thereby shifting the carriage laterally a slight distance with respect to the saw.

A guiding member of my improved construction is comparatively simple, can be easily and cheaply installed, is applicable for use in connection with practically all mills having a reciprocating carriage, and the offsetting mechanism associated with said guiding member is effective in automatically drawing the carriage away from the saw during the return or reverse movement of said carriage.

It will be readily understood that minor changes in the size, form and construction of the various parts of my improved guiding member can be made and substituted for those herein shown and described, without departing from the spirit of my invention, the scope of which is set forth in the appended claims.

I claim:

1. In combination with a saw mill carriage, a guiding member parallel to the direction of travel of the carriage, a housing slidable on said member and connected to the carriage, and means for holding the housing against movement upon the change of direction of travel of the carriage, and means on the housing for laterally shifting the carriage.

2. In combination with a saw mill carriage, a guiding member parallel to the direction of travel of the carriage, a housing slidable on said member, a link secured to the carriage and pivoted to the housing, means for holding the housing against movement upon the change of direction of travel of the carriage, and means on the housing for oscillating said link whereby the carriage is shifted laterally.

3. In combination with a saw mill carriage, a guiding member parallel to the direction of travel thereof, a housing provided with gripping members mounted on the guiding member, and means connected to said carriage and housing engaging the gripping members and normally holding them free from the guiding member, but permitting said gripping members to engage the guiding member upon a reversal of the direction of travel of the carriage, whereby said connecting means will operate to shift the carriage in a lateral direction.

4. In combination with a saw mill carriage, a guiding member arranged adjacent to the carriage and parallel to its direction of travel, a pair of associated members arranged for sliding movement on the guiding member, yielding pressure means for normally forcing one of said members into engagement with the guiding member, means for periodically releasing said member from the guiding member, and a connection between the other member and the carriage.

5. In combination with a saw mill carriage and a guiding member therefor disposed parallel to the direction of travel of the carriage, a pair of gripping members adapted to envelop the guiding member, one of said gripping members being pivotally connected to the carriage, and means on said gripping member for holding the second gripping member away from the guiding member, after the starting of the travel of the carriage.

6. In combination with a longitudinally movable saw mill carriage, a rigid guiding member, a gripping member connected to the carriage and adapted to slide on the guiding member, a second gripping member contiguous to the first gripping member normally out of engagement with the guiding member, a lever provided with oppositely disposed shoulders, pivoted to the first gripping member and connected to the second gripping member, a finger adapted to contact with one of said shoulders during the forward travel of the carriage and the opposite shoulder during the backward travel of the carriage, during which periods the gripping members are freee to travel on the guide member, and means for causing said gripping members to grip the guide member at the ends of the travel of the carriage.

7. In combination with a saw mill carriage and a guide member therefor, a housing provided with grippers slidable on said guide member, a link connected to the carriage and the housing, means for causing said grippers to engage the guide member after the start in either direction of the carriage whereby said link is oscillated and the carriage shifted laterally.

In testimony whereof I hereunto affix my signature this 24th day of Dec., 1917.

THOMAS A. COLEMAN.

Witnesses:
P. C. JORDAN,
A. M. WILLIS.